United States Patent Office 3,152,134
Patented Oct. 6, 1964

3,152,134
TETRAHYDROISOQUINOLINE DERIVATIVES
AND THEIR PREPARATION
Leslie G. Humber, Montreal, Quebec, Canada, assignor to American Home Products Corporation, New York, N.Y., a corporation of Delaware
No Drawing. Filed July 30, 1963, Ser. No. 298,581
3 Claims. (Cl. 260—288)

This invention relates to novel chemical compounds, certain new derivatives of 1,2,3,4-tetrahydroisoquinoline, and to the process utilized in their preparation.

More particularly, my invention relates to certain bis-1,2,3,4-tetrahydroisoquinolinomethyl derivatives, which new chemical compounds possess valuable pharmacological properties.

The new chemical compounds, in base form, may be represented generically by the Formula I shown below:

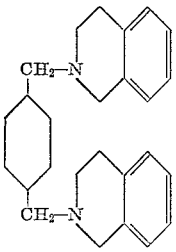
I

It is generally understood that compounds of the type described above are capable of existing in two geometrically isomeric forms, commonly called cis and trans depending on the orientation of the two side chains which are attached to the central nucleus. It is understood that all the geometrical isomers referred to are intended to be within the scope of my invention.

The novel chemical compounds possessing interesting biological activities, in base form, are thus bis-1,2,3,4-tetrahydroisoquinolinomethyl derivatives. These compounds, being basic in nature, form acid addition salts. Such salts with pharmacologically acceptable acids are biologically equivalent to the free base and constitute a preferred form for the administration of the compounds of my invention.

The new chemical compounds forming the subject of this invention are useful as agents for lowering serum cholesterol levels.

My preferred procedure for preparing the new chemical compounds may be described schematically as follows:

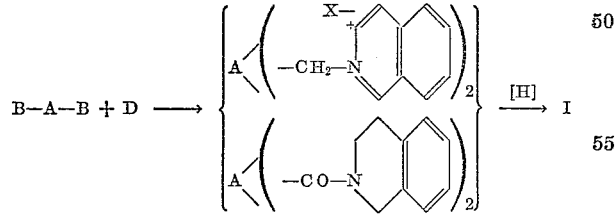

wherein, when B is $CH_2$—X, D is isoquinoline; and when B is —CO—X, D is 1,2,3,4-tetrahydroisoquinoline; and where X is halogen.

[H] represents a reducing agent such as, for example, sodium borohydride or lithium aluminum hydride and A is the divalent cyclohexane radical with the substituents in the 1,4-positions.

My invention may be illustrated by the following examples, which should be regarded as illustrative of this invention, rather than as limiting the same.

EXAMPLE 1

1,4-Bis-(Isoquinolinium Methyl)-Cyclohexane Diiodide 1,4-bis(iodomethyl)cyclohexane (15.0 g.) (Haggis and Owen, J.C.S., 404, 1953) dissolved in ethanol was added dropwise with stirring to isoquinoline (26 g.) in ethanol with stirring. The mixture was refluxed for 5 hours, then the ethanol was removed, water added and the mixture extracted with benzene. The benzene extract yielded the title compound. It was crystallized from water and had M.P. 310° C. Analysis confirmed the empirical formula $C_{26}H_{28}N_2I_2$.

EXAMPLE 2

N,N'(Cyclohexane-1,4-Dicarbonyl)Bis-1,2,3,4-Tetrahydroisoquinoline 1,4-cyclohexane dicarbonylchloride (prepared from the corresponding diacid and thionyl chloride) (9.8 g.) was added portionwise to 1,2,3,4-tetrahydroisoquinoline (39.9 g.) in 300 ml. of benzene and heated to reflux for 4 hours. The precipitate was filtered and triturated with 300.0 ml. of water, filtered, dried and crystallized from chloroform to yield the title compound; M.P. 244–245° C. Analysis confirmed the empirical formula $C_{26}H_{30}N_2O_2$.

EXAMPLE 3

1,4-Bis(1,2,3,4-Tetrahydroisoquinolinomethyl)-Cyclohexane (a) The diamide of Example 2 (12.5 gm.) was added portionwise to a slurry of 14.0 g. of lithium aluminum hydride in 300.0 ml. of ether and heated to reflux for 24 hours. After cooling 50.0 ml. of water were added dropwise, the resulting precipitate filtered and the solvent evaporated to yield the title compound, M.P. 110–111° C. The dihydrobromide salt was prepared by dissolving the free base in ether and adding anhydrous hydrogen bromide. The resulting dihydrobromide was filtered and crystallized from methanol. It had M.P. 342° C. Analysis confirmed the empirical formula $C_{26}H_{36}N_2Br_2$.

(b) The quaternary salt of Example 1 (20 g.) was reduced with sodium borohydride (2.8 g.) in a 3:1 water:ethanol mixture. The mixture was refluxed for 30 minutes, cooled and extracted with chloroform. The chloroform was removed in vacuo and the ether soluble portion of the residue was crystallized from hot acetone to yield the title compound, M.P. 110–111° C., identical with that described above.

I claim:

1. A compound selected from the group which consists of bases of the Formula I, and salt thereof with pharmacologically acceptable acids.

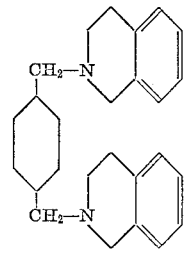

2. A compound of the Formula I

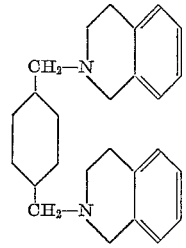
I

3. The hydrobromic acid salt of 1,4-bis(1,2,3,4-tetrahydroisoquinolinomethyl)-cyclohexane.

No references cited.